United States Patent [19]
Benton

[11] Patent Number: 5,868,052
[45] Date of Patent: Feb. 9, 1999

[54] LATHES FEATURING PIVOTING TOOL CARRIAGES

[75] Inventor: Clarence Eugene Benton, Richmond, Va.

[73] Assignee: Accu International, Inc., Ashland, Va.

[21] Appl. No.: 815,331

[22] Filed: Mar. 10, 1997

Related U.S. Application Data

[63] Continuation-in-part of Ser. No. 497,642, Jun. 30, 1995, Pat. No. 5,623,859.

[51] Int. Cl.[6] ...................................................... B23B 5/02
[52] U.S. Cl. ................................. 82/112; 82/138; 82/141
[58] Field of Search ................................ 82/138, 136, 1.5, 82/12, 11.5, 86, 111, 112, 141

[56] References Cited

U.S. PATENT DOCUMENTS

| | | |
|---|---|---|
| 1,963,023 | 6/1934 | Libby .......................................... 82/138 |
| 2,553,147 | 5/1951 | Roescheise ................................... 82/86 |
| 3,104,572 | 9/1963 | Pabst et al. . |
| 3,165,769 | 1/1965 | Parsons et al. . |
| 4,452,111 | 6/1984 | Anderson . |
| 4,493,231 | 1/1985 | Wossner ................................ 82/112 X |
| 4,506,570 | 3/1985 | Wood et al. . |
| 4,510,828 | 4/1985 | Bogaerts et al. . |
| 5,099,728 | 3/1992 | Thiem . |
| 5,152,104 | 10/1992 | Wood et al. ............................... 51/118 |
| 5,623,859 | 4/1997 | Benton . |

FOREIGN PATENT DOCUMENTS 1574498  6/1990  United Kingdom .

Primary Examiner—Andrea L. Pitts
Assistant Examiner—Henry W. H. Tsai
Attorney, Agent, or Firm—James L. Ewing, IV; Kilpatrick Stockton LLP

[57] ABSTRACT

Lathes for working brake rotors and other components as desired. The lathes employ a pivoting carriage which mounts a tool for working, cutting, finishing or otherwise having a desired effect on the workpiece. Control of carriage positioning is accomplished preferably using a feedscrew, hydraulic or other desired linkage which is connected, directly or indirectly, to the carriage and to the frame of the lathe (other mechanisms or linkages may also be used). Such lathes may also employ a slide carriage for working brake drums, which carriage is preferably located on the side of the lathe opposite the pivoting carriage. The slide carriage may be easily removed and sold as a separate unit to allow a number of options for buyers. This arrangement also eliminates the changeover time and effort required in conventional lathes that employ cross slide mechanisms; instead of the need to replace the tool post assembly ordinarily employed in working rotors with the boring bar assembly ordinarily used for working drums in conventional lathes, the operator simply uses the already-configured rotor or drum working unit on the desired side of the lathe. Lathes according to the present invention are mechanically simpler, and easier and less expensive to manufacture because they eliminate the need for conventional cross slide mechanisms. Because of the simplicity, however, lathes according to the present invention allow more precise control over the tool and thus a more precise finish on the workpiece.

21 Claims, 10 Drawing Sheets

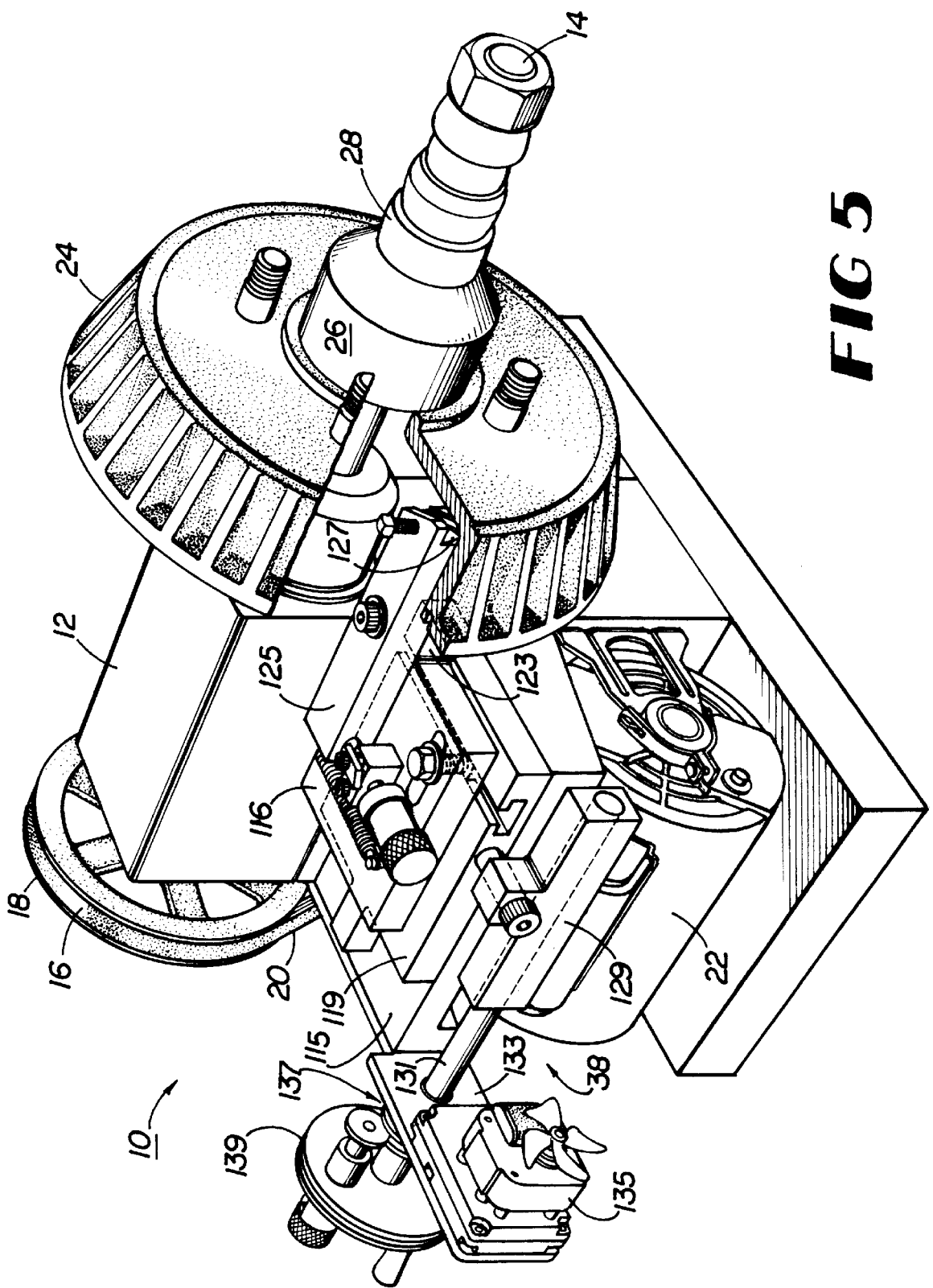

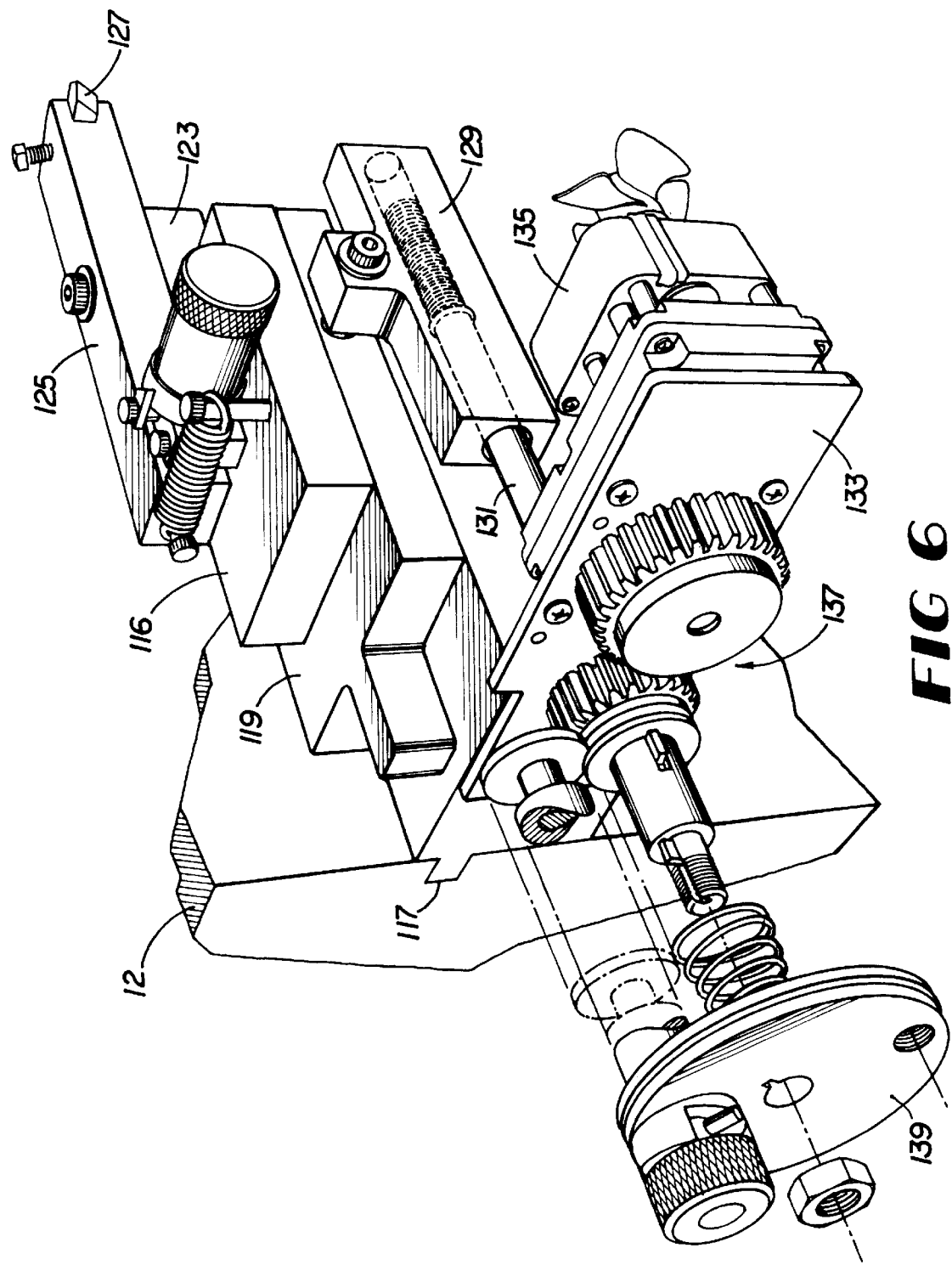

LATHES FEATURING PIVOTING TOOL CARRIAGES

The present invention relates to lathes, such as those employed for finishing automobile brake components, which employ pivoting tool carriages rather than conventional cross slide carriages.

This is a a continuation-in-part of Ser. No. 08/497,642 filed on Jun. 30, 1995, now U.S. Pat. No. 5,623,859, by C. E. Benton of Richmond, Va. for "Lathes Featuring Pivoting Tool Carriages."

BACKGROUND OF THE INVENTION

Disc brakes have come to predominate in automobile braking systems and are employed in far greater numbers than drum brakes. However, the disc brake rotors require accurate facing and finishing in order to avoid poor or unsatisfactory braking performance. The advent of disc brakes accordingly requires brake lathes which more accurately control positioning of cutting and finishing tools than were required when boring and finishing brake drums.

One form of brake lathe which has proved quite satisfactory is disclosed in U.S. Pat. No. 4,506,570 (which is incorporated herein by this reference). That lathe positions a disc brake rotor on an arbor held in place by a bell clamp and a number of spacers as desired. A saddle, upon which tool posts are pivotally mounted for receiving cutting and finishing tools, is positioned using a cross slide mechanism. A first, longitudinal dovetail way oriented parallel to the axis of the arbor, carries a second, transverse dovetail way on which the saddle is mounted. Feedscrews connected to the ways in rotating and threaded fashion are employed to control longitudinal and transverse positioning of the saddle, and therefore, the cutting and finishing tools, with great accuracy. Power sources may be connected to each feedscrew via clutches and gearboxes for automatic positioning, cutting and finishing.

The longitudinal and transverse ways of these conventional brake lathes are relatively massive and require great care, effort and thus expense to manufacture and machine properly in order to obtain the close tolerances required to face brake rotors properly, and to be sufficiently durable. Additionally, over the life span of the lathe, the ways slide relative to each other only a fractional portion of their length, so that they wear unevenly. Moreover, the length of the dovetail ways permits filings, shavings and other debris from the cutting and finishing process to become interposed in the ways and create additional wear and inaccuracy in positioning of the tools.

It is also the case that on conventional brake lathes which feature the cross slide mechanism for positioning the cutting or finishing tool, considerable time and effort are required for changeover from drum boring to rotor facing configuration, and vice versa. Thus, for example, changeover from rotor facing to drum boring configuration requires removal of the saddle, tool bars and tools that are employed for facing rotors, bolting on or otherwise attaching on the cross slide mechanism the saddle that is employed for boring drums, and then making all necessary adjustments to ensure that the tool is properly placed and all fasteners have been properly tightened into place in order to avoid inadvertent movement of the drum cutting tool. Equipping a lathe with two cross slide mechanisms to eliminate this changeover problem would be inordinantly expensive in the price-competitive brake lathe market.

Another concern raised by drum boring operations on conventional brake lathes is that the operator finds it difficult to see the tool as it works the inner cylindrical surface of the drum. The cross-slide mechanism is located on the side of the lathe where the hand wheels and electrical controls are found. Therefore, where the operator is stationed, the boring bar that extends from the drum boring saddle extends into the drum and works toward the operator against the interior drum surface. This geometry makes it more difficult to set the tool up initially for finishing the drum, and even more difficult to monitor the finishing operation.

SUMMARY OF THE INVENTION

The present invention provides a lathe which, instead of a cross slide tool feed mechanism for facing brake rotors, employs a tool carriage which pivots relative to the frame. The pivoting carriage position relative to the frame may be accurately controlled via a feedscrew, appropriate gearing such as worm gear and rollers, rack and pinion, and other linkages, including actuators driven by springs with hydraulic or compressed air damping, hydraulic or compressed air cylinders, powered cabling, hydraulic actuated linkages, and any other desired conventional or non-conventional linkage or control mechanism to pivot the carriage with respect to the lathe frame. The lathe avoids longitudinal positioning of the carriage as was the case with a cross slide mechanism, out of recognition of the predominance of disc brakes in the automobile industry. The pivoting carriage may be adjustably connected to the feedscrew journal as by a slotted connection, so that the rate of sweep of the cutting tool over the rotor surface may be varied without varying the speed of the feedscrew power source.

The carriage is connected to the frame via a pivot way formed of circular or partially circular areas on each of the carriage and the frame, and the carriage is retained against the frame using a pivot way shaft whose tension may be accurately controlled. The pivotway is a very large interface, as compared, for instance to conventional dovetail ways, and significantly, the size of the interface does not vary as the tool is being moved during the finishing process as is the case in a conventional cross slide mechanism. Furthermore, only one interface is required, the pivotway, so that only one moving part is required to position the tool—the pivoting carriage (and the saddle, tool bars, tools and other components that are rigidly attached to it.) In conventional lathes, by contrast, at least two interfaces are required, the lateral and the longitudinal dovetail ways, and twice as many moving parts. This structural simplicity therefore eliminates at least half of the potential for inadvertent cutting tool movement during the cutting or finishing process. (A pivotway bearing such as a delrin washer may be employed. A self lubrication system such as the one disclosed below if no bearing is used.) The inventor has found that this pivoting carriage mechanism positions finishing tools with such great accuracy that brake rotors may be finished to a far greater tolerance than was possible with conventional cross slide mechanism automobile brake lathes.

The pivoting carriage avoids the mass, complexity and expense of the pair of dovetail ways required in conventional cross slide mechanisms. Lathes according to the present invention may therefore be manufactured with far less expense than conventional automobile brake lathes.

The rotational nature of carriage movement relative to the frame, particularly when the pivot way includes a delrin bearing, avoids the uneven wear previously encountered in cross slide mechanism dovetail ways, so that, over time, lathes according to the present invention do not lose their accuracy in the ranges of motion most frequently employed in cutting and finishing processes.

In versions employing a feedscrew linkage, the pivoting carriage may be adjustably connected to the feedscrew journal as by a slotted connection, so that the rate of sweep of the cutting tool over the rotor surface may be varied without varying the speed of the feedscrew power source. Similarly, the pivoting carriage may be adjustably controlled using appropriate valving in hydraulic and compressed air linkages, spring tension, power to motor actuators and other control schemes.

Despite their radically different tool positioning mechanisms, lathes according to the present invention nevertheless are adapted to accommodate conventional automobile brake lathe tool saddles and tool posts, which contain tool positioning verniers and other structures to which brake mechanics around the country have become accustomed and expect. Lathes according to the present invention can also allow positioning of the tool via a hand wheel (in feedscrew versions) as is the case in conventional automobile brake lathes, again for leveraging on the familiarity of mechanics with conventional tool positioning structure and field.

Pivoting carriage lathes according to the present invention may also feature a sliding drum finishing saddle on the side of the housing opposite to the rotor finishing pivoting carriage. Because the drum finishing operation only generally requires that the tool move parallel to the lathe arbor, the drum finishing saddle requires only a single slide mechanism, and one which can use a keyway as opposed to dovetail ways. Again, the single slide mechanism avoids the expense associated with dovetail ways and the inaccuracies caused by the additional interfaces and moving parts encountered in a cross slide mechanism. Because the drum finishing saddle is located on the opposite side of the lathe from the operator, the operator can now see the tool in order to position it properly against the interior braking surface of the drum, and in order to watch the tool during the cutting and finishing operation.

Using the separate drum finishing unit, no changeover is required to change the lathe from drum finishing to rotor finishing configuration and vice versa. The operator simply needs to position the pivotway or drum unit into position using the feedscrews in order to begin the operation. The saving in time is all the more important, given the increased consideration to labor expense currently.

The separate drum finishing unit may also be sold separately from the lathe in order to provide buyers more options. Some buyers/users of the lathes may not be as interested in boring drums, and instead desire an affordable lathe which faces brake rotors very accurately, and the present invention accommodates them. The drum boring mechanism may be purchased later, and easily attached in a modular fashion using only one or more fasteners and a electrical plug connector.

It is accordingly an object of the present invention to provide brake lathes which may be inexpensively manufactured, but which feature superior wear characteristics.

It is an additional object of the present invention to provide lathes which use a pivoting carriage assembly to work brake discs for additional mechanical simplicity and dynamic precision, yet which employ conventional tool saddles, tool posts, and, in some cases, hand wheels to which mechanics have become familiar.

It is an additional object of the present invention to provide brake lathes which allow more accurate finishing of brake discs than was possible using conventional brake lathes.

It is an additional object of the present invention to use a pivoting carriage assembly to work brake rotors, and a separate sliding carriage assembly to work brake drums, out of recognition that rotors require working laterally to the axis of the lathe arbor, drums require working parallel to the axis of the arbor, and that instead of trying to use an expensive and delicate cross slide mechanism to accommodate both directions, the rotor and drum working operations should be addressed separately with mechanically more simple but more precise components.

It is an additional object of the present invention to provide buyers with the options of a lathe that is adapted to work brake rotors or one that is adapted to work rotors and drums.

Other objects, features and advantages of the present invention will become apparent with reference to the remainder of this document.

BRIEF DESCRIPTION OF THE DRAWINGS

FIG. 5 is a perspective view, from another perspective, of the lathe of FIG. 1, accentuating the drum working unit of the lathe.

FIG. 6 is a perspective view of a portion of the lathe of FIG. 1, further accentuating the drum working unit.

DETAILED DESCRIPTION OF THE DRAWINGS

Figure 1:
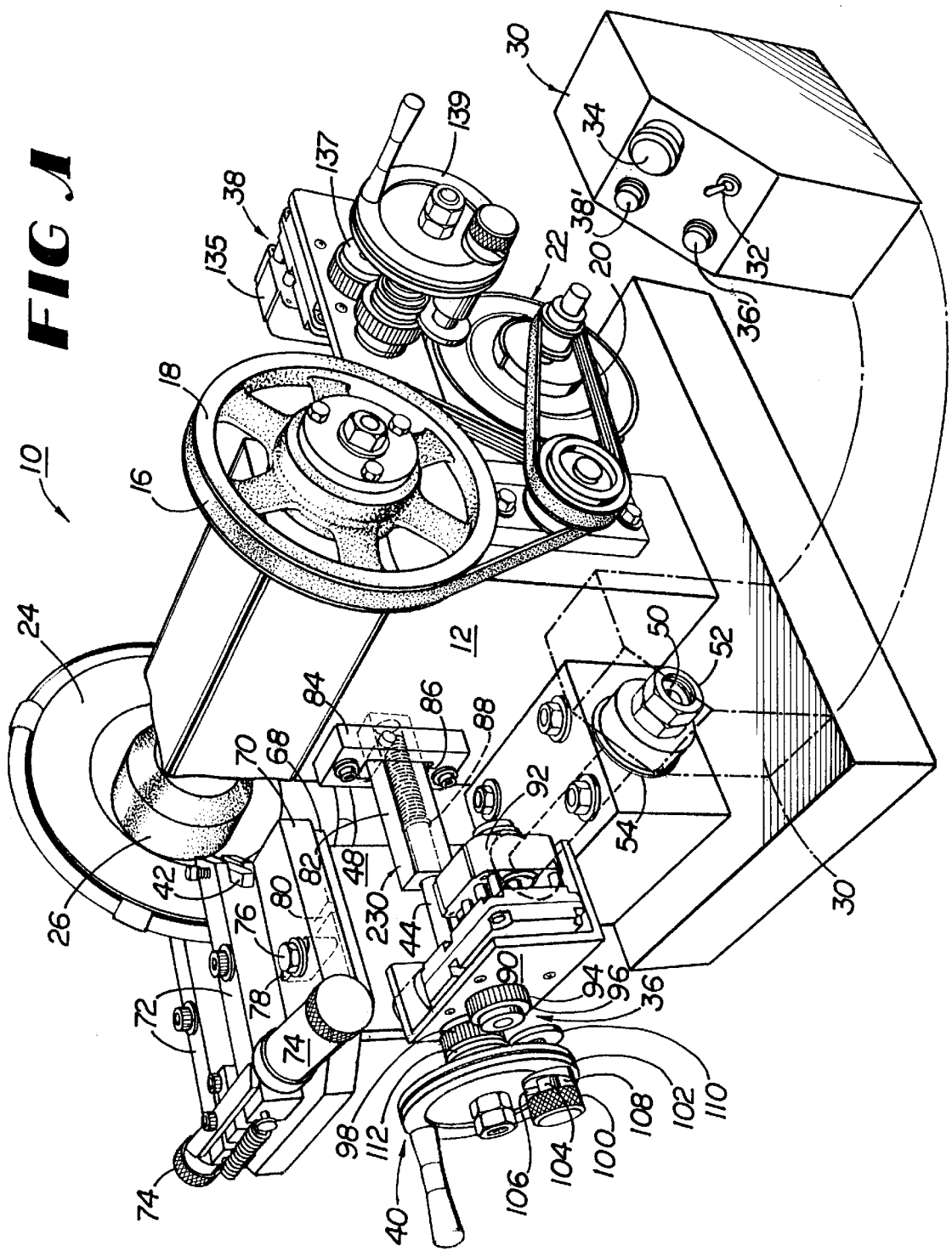
FIG. 1 is a perspective view of a preferred embodiment of a lathe according to the present invention.

FIG. 1 shows a lathe 10 according to the present invention. Lathe 10 generally comprises a frame 12 in which an arbor 14 may be (itself, or more commonly via a spindle) journalled in conventional fashion and driven using a belt drive (or other desired drive) 16 comprising, in the depicted embodiment, a plurality of drive wheels 18 and belts 20 connecting arbor 14 to motor 22 (again, more conventionally via a spindle). Motor 22 may be an AC motor (or any other desired motor); in the present embodiment, it is adapted to rotate at approximately 1,725 r.p.m. and belt drive 16 is adapted to cause arbor 14 to rotate at 200 r.p.m. Any suitable combination of elements may be used to rotate arbor 14 at any desired speed as will be appreciated by those who are familiar with this equipment.

Arbor 14 is adapted to mount a workpiece or component 24 such as a brake drum, brake rotor or flywheel from an automobile, truck, or any other vehicle or engine (or, for that matter, any other component which needs to be worked on a lathe). In the depicted embodiment, a bell clamp 26 is employed with spacers 28 as desired. Lathe 10 features a power control system 30 which distributes power under desired control to motor 22 and other components as discussed later. The power control system 30 is conventional in nature. In the depicted embodiment, a control box 30 features an on/off switch 32, a kill switch 34, and switches 36' and 38' for controlling power to the rotor working unit 36 and the drum working unit 38 selectively, and if necessary, changing the direction of rotation of motor 22 or arbor 14 depending upon which of the rotor working or drum working units is actuated.

Rotor working unit 36 comprises, at a first level, a pivoting assembly 40 that is adapted to mount a tool 42. At this first level, the invention simply requires that the pivoting assembly 40 is pivotally or rotatably connected to frame 12 so that it may pivot or rotate with respect to frame 12 and move tool 42 across workpiece 24 in order to work workpiece 24. At a more detailed level, pivoting assembly 40 of the lathe shown in FIG. 1 is pivotally connected to frame 12 at a first connection and to a feedscrew 44 at a second connection 46. The feedscrew 44 of that lathe is also connected to frame 12 in such a fashion that when it is rotated, pivoting assembly 40 pivots or rotates relative to frame 12 in order to move tool 42 relative to the workpiece 24. Other mechanisms may just as easily be employed to adjust the angular position of pivoting assembly 40 relative to frame 12, including rack and pinion mechanisms, worm gear drive mechanisms, hydraulic, compressed air, hydraulic/mechanical, compressed air/mechanical, spring actuated as dampened by hydraulic or compressed air mechanisms, and electrical actuated linkages for controlling systems for moving the tool 42 with respect to the workpiece 24, among others. There may be wholly or partially pivotally or fixedly attached to any portion of the pivoting assembly 40 and the frame 12. Where a feedscrew 44 is used, it may be connected in a threaded fashion to frame 12, pivoting assembly 40, or both.

In the embodiment shown in FIGS. 1–4, pivoting assembly 40 comprises a carriage 48 which is pivotally attached to frame 12 using a pivotway shaft 50. Shaft 50 may be retained on frame 12 using one or more retainer nuts 52 and other components such as, if desired, a bellville washer 54.

Figure 4A:
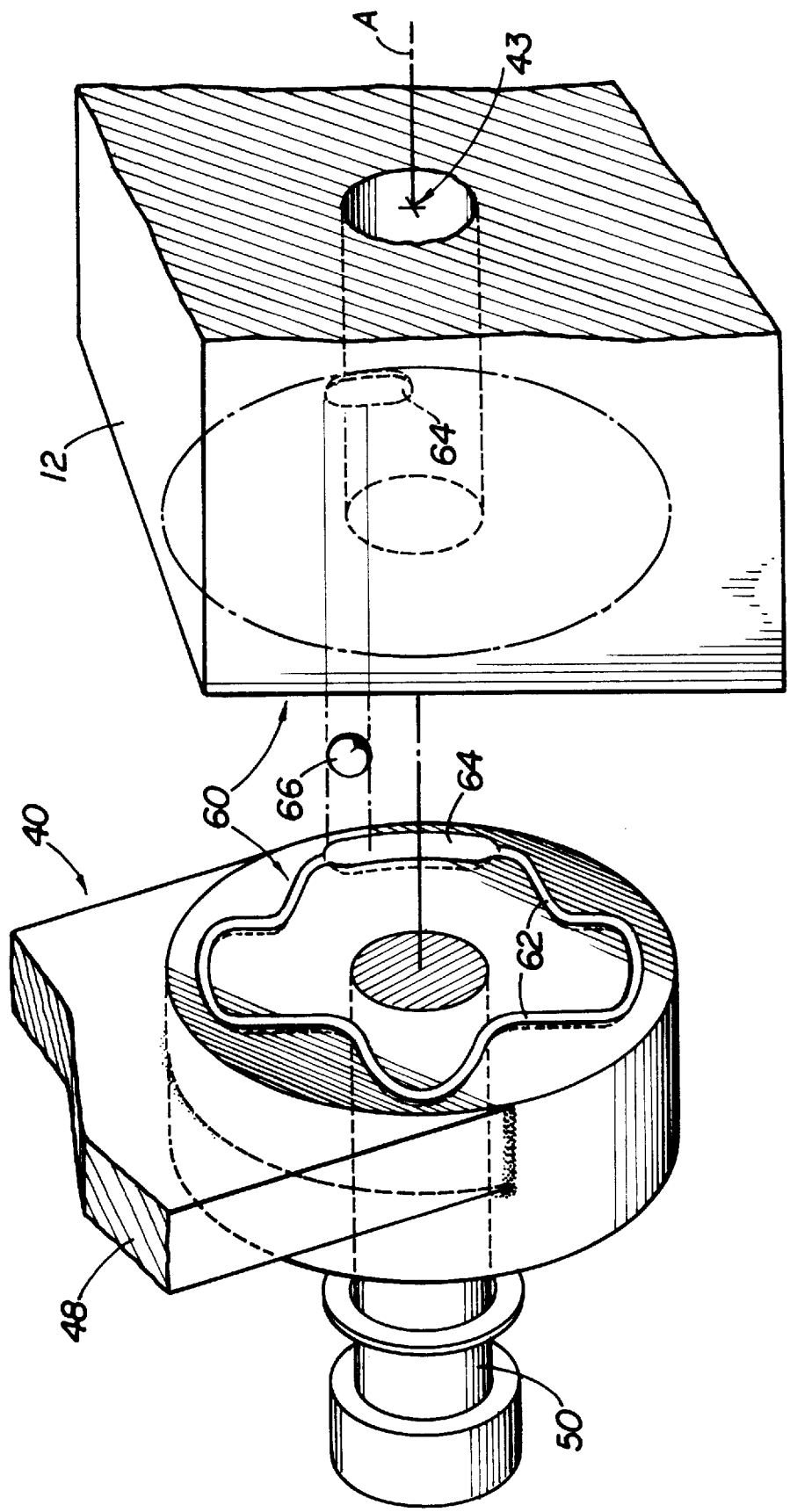
FIG. 4A is cross sectional view of a portion of a lathe according to the present invention accentuating a self lubricating system.

The interface 56 between pivoting assembly 40 and frame 12 is preferably circular as can be seen in the drawings and features a relatively large surface area. In the depicted embodiment, interface 56 is between carriage 48 and frame 12 and comprises machined surfaces of those components with appropriate lubricant. This configuration is appropriate where frame 12 and carriage 48 are cast and machined. Additional components may be employed as well, including a teflon, nylon, delrin, other plastic or metallic (such as copper) washer 58. A self-lubricating system 60 as shown in FIG. 4A may be employed. Lubricating system 60 generally comprises a channel 62 circumnavigating interface 56 as in a tortuous fashion, and connecting at both ends to an arcuate bore 64 in which a ball-bearing 66 is placed. Ball-bearing 66 moves as carriage 48 moves relative to frame 12, in order to move lubricant through arcuate bore 64 and channel 62 in order to lubricate interface 56.

Carriage 48 features a saddle bed 68 which is adapted to accommodate a saddle 70 which mounts tool posts 72 in conventional fashion. Tool posts 72 as shown in the depicted embodiment are mounted pivotally with respect to saddle 70 and conventional structure for accommodating tools 42 so that they may be easily adjusted and positioned relative to workpiece 24 (as by, for instance, turning verniers 74). Again, these components mounted on saddle 70 may be conventional and can be configured conventionally. Saddle 70 may be connected to saddle bed 68 using one or more bolts 76 which fit in slot 78 formed in saddle bed 68. Bolts 76 may be tightened when saddle 70 is positioned appropriately. Positioning of saddle 70 relative to saddle bed 68 may be made more precise using one or more conventional keyways 80.

As shown in FIGS. 1–3, saddle 70 is preferably larger (in plan) than saddle bed 68 so that saddle bed 68 is covered at all times and regardless of the adjustment of saddle 70 with respect to saddle bed 68. The larger saddle 70 obstructs filings and other detritus from the facing operation, and other foreign matter, from falling onto saddle bed 68 and fouling the interface between saddle bed 68 and saddle 70, including keyways 80. The larger saddle 70, unlike in conventional lathes, therefore precludes another opportunity for degradation of tolerances that ultimately affect positioning of tool 42 with respect to workpiece 24.

In a preferred feedscrew linkage embodiment shown in the drawings, feedscrew 44 connects to frame 12 using a feed nut 82 that is pivotally mounted to a pillow block 84 attached or connected to the side of frame 12. Frame 12 may also feature a cavity 86 through which the feedscrew 44 can extend. Feedscrew 44 is received in feed nut 82 in threaded fashion so that feedscrew 44 may move relative to frame 12 in rotating, threaded fashion and pivoting fashion. Feed nut 82 preferably contains an elongated portion, which may or may not be threaded, in order to shroud the threads of feedscrew 44 to preclude them from being contaminated with cuttings or other debris. Feedscrew 44 may include an O-ring 88 which wipes the inner surface of feed nut 82 for further isolation of the threads.

Feedscrew 44 is connected, in the preferred embodiment shown in the drawings, to carriage 48 via a journal block 90. Journal block 90 in this embodiment receives feedscrew 44 in non-threaded fashion, but rotatably. Journal block 90 and feedscrew 44 are adapted to preclude feedscrew 44 from moving in longitudinal fashion relative to journal block 90. Journal block 90 is connected to carriage 48 using a pin or bolt which may be positioned in a slot in carriage 48 and to receive to journal block 90. The bolt may be loosened so that journal block 90 may be adjustably mounted relative to carriage 48. The rate of sweep of tool 42 over workpiece 24 may accordingly be adjusted without varying the speed of feedscrew rotation, simply by changing the geometry of the three point linkage between carriage 48 and frame 12: the journal block 90/feedscrew 44 connection, the frame 12/feedscrew 44 connection, and the carriage 48/frame 12 connection.

Feedscrew 44 may be powered for automatic control of movement of tool 42 using a feedscrew power source 92 which, in the preferred embodiment, is an AC motor connected via gear drive to a clutch mechanism 94 comprising a driving gear 96, and a driven gear 98 connected in sliding fashion (but preferably keyed) axially to feedscrew 44. A cam mechanism 100 mounted on hand wheel 102 is employed to move driven gear 98 and engage or disengage it to or from driving gear 96. Cam mechanism 100 generally features a shaft 104 to which is mounted a pin, follower, or wiper 106 that rides cam surface 108 formed on or attached to hand wheel 102. As the pin 106 travels on cam surface 108, a follower 110 on the opposite side of shaft 104 cooperates with annulus 112 formed in driven gear 98 to slide driven gear 98 axially relative to feedscrew 44 for engagement/disengagement with driving gear 96. Obviously, any desired mechanism may be employed for connecting power source 92 to feedscrew 44. When this clutch 94 mechanism is disengaged, hand wheel 102 may be employed manually to position tool 42 relative to workpiece 24. When engaged, power source 92 controls such position.

Figure 2A:
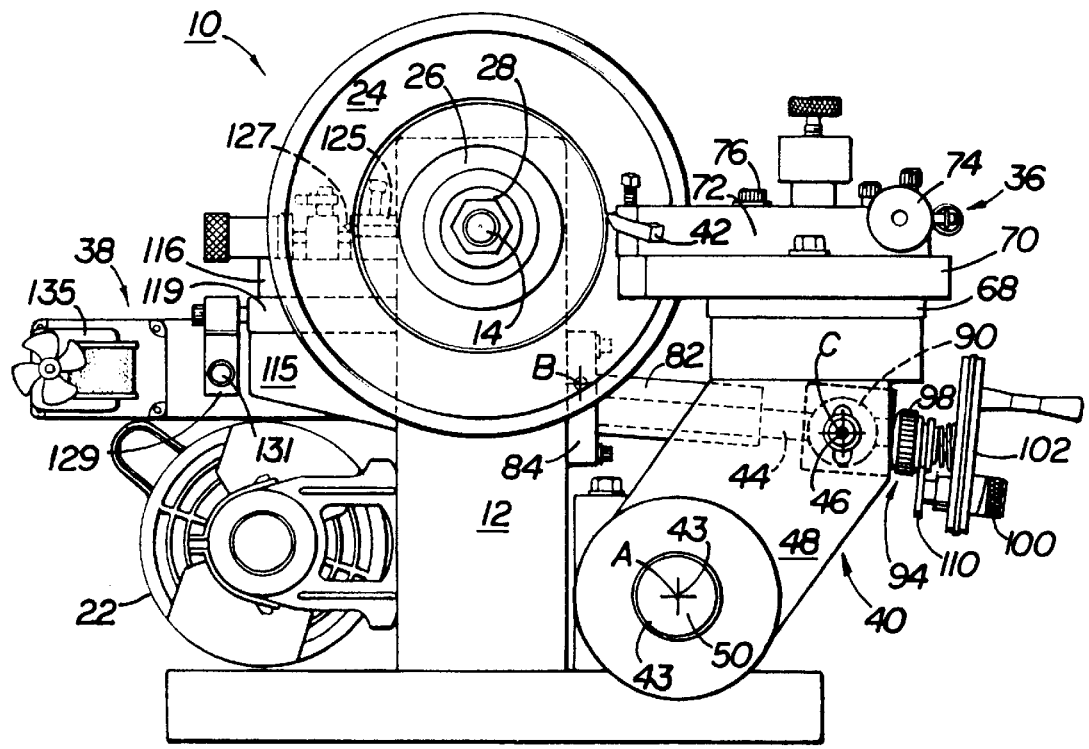
FIG. 2A is a side elevational view of the lathe of FIG. 1.
Figure 2B:
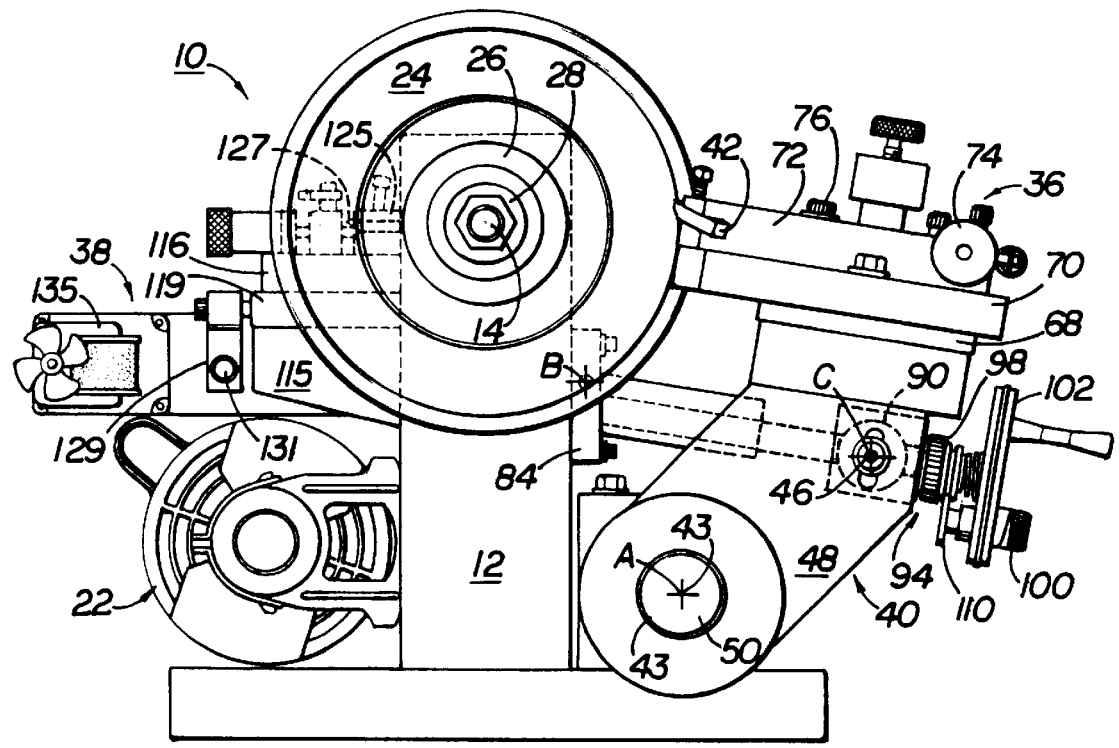
FIG. 2B is a second side elevational view of the lathe of FIG. 1.
Figure 2C:
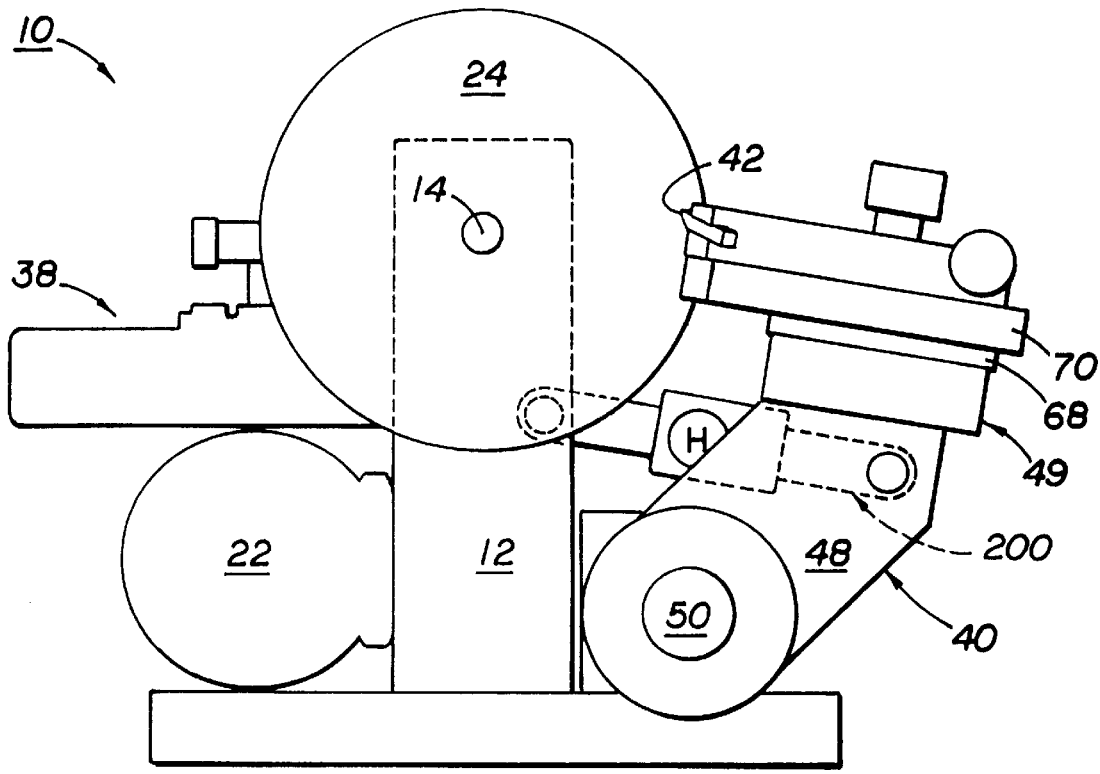
FIG. 2C is a schematic side elevational view of lathes according to the present invention using a hydraulic linkage or hydraulic/mechanical linkage used to position the tool relative to the lathe.

FIG. 2C is a schematic representation of lathes according to the present invention which employ hydraulic packages to move carriage 48 or pivoting assembly 40 and tool 42 relative to workpiece 24 and frame 12. Hydraulic mechanisms may include conventional hydraulic control mechanism commensurate within cost, precision and reliability requirements. The hydraulic linkage 200 may include mechanical linkage, including hydraulic actuators which operate cams, push rods and other mechanical elements. The hydraulic or hydraulic/mechanical linkage may be coupled to any portion of lathe 12 and any portion of the pivoting structure which includes carriage 48. Such linkages may be attached to the lathe 12-side or the pivoting side via pins or other pivotal structure, or the linkage may be attached to one or both the lathe 12-side and the pivoting side rigidly as shown, for instance, in one form in FIG. 2F. Conventional hydraulic mechanisms, as shown for instance in FIG. 3E, include a piston or other hydraulic actuator 400 which acts relative to the lathe 12-side and the pivoting-side, a pump 402 for supplying pressure to the actuator, control valving 404, relief valving 406, reservoir 408 and other hydraulic elements as desired, and which are conventional in nature and conventionally employed.

Figure 2D:
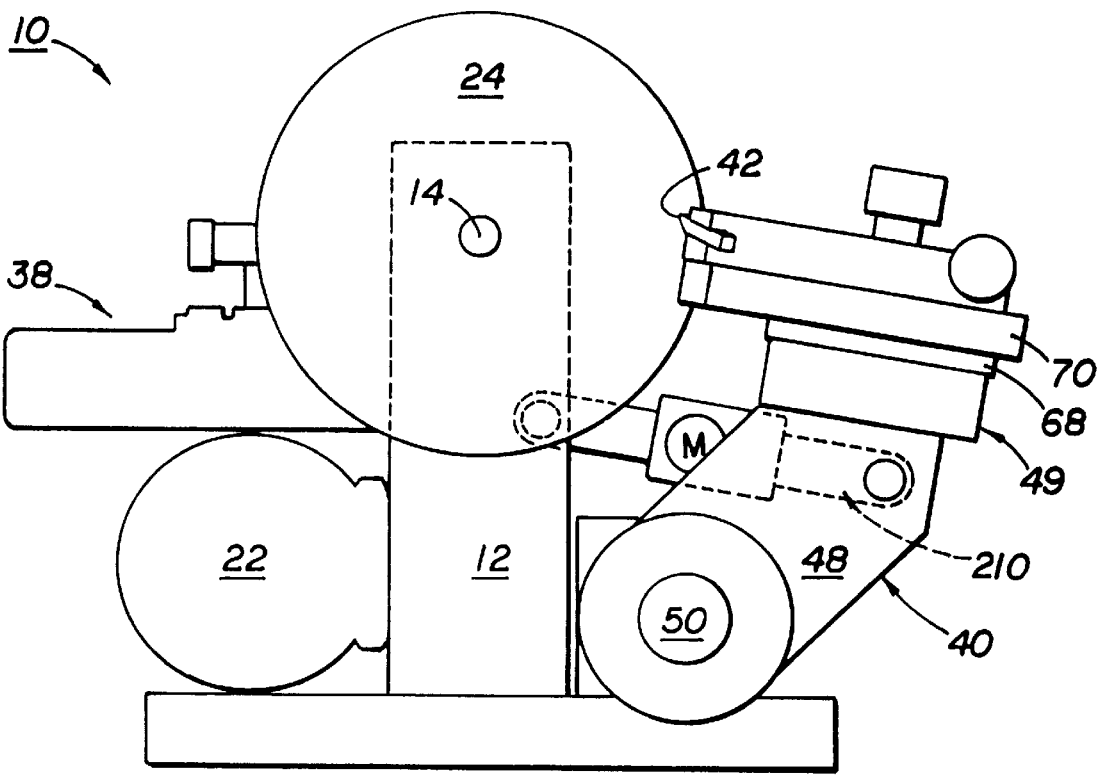
FIG. 2D is a schematic side elevational view of lathes according to the present invention using a mechanical linkage or electro/mechanical linkage used to position the tool relative to the lathe.

FIG. 2D schematically shows device 10 according to the present invention in which mechanical linkage and/or electro/mechanical linkage 210 controls movement of tool 42 relative to lathe 12 and workpiece 24. Again, the mechanical or electro/mechanical linkage 210 may be connected or coupled to the lathe 12-side and the pivoting-side in any desirable manner including pivoting respective to lathe 12-side and pivoting-side, or fixed with respect to either or both sides. Suitable mechanical and/or electro/ mechanical means include rack and pinion mechanisms, worm gear drive mechanisms, cammed mechanisms, powered cable mechanisms, bar linkages, linear motors and any other suitable linkage which is structured and operates in a conventional manner. It is conventional to apply such mechanical and/or electro/mechanical linkage to lathes as disclosed herein, the objects being to control movement of tool 42 relative to lathe 12 in an efficient, effective, precisely controlled manner.

Figure 2F:
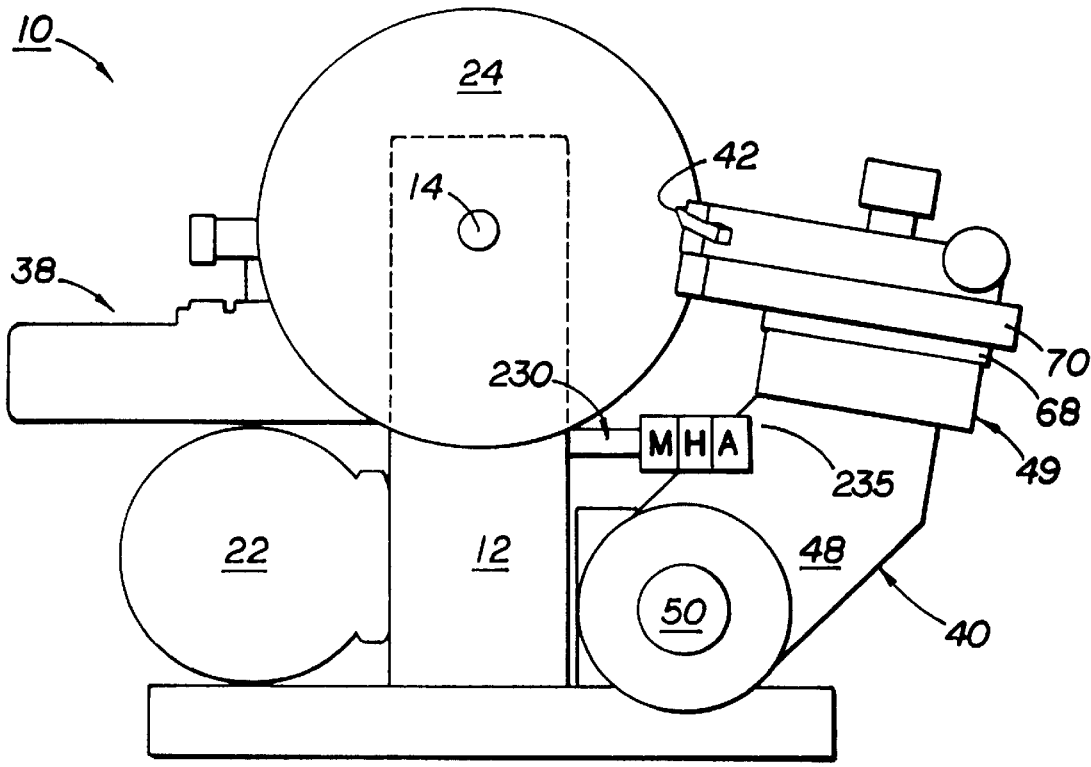
FIG. 2F is a schematic view of lathes according to the present invention in which a mechanical, electromechanical, hydraulic or compressed air (or any combination thereof linkage is rigidly connected to either of the lathe and/or the carriage in order to position the tool relative to the lathe.
Figure 2E:
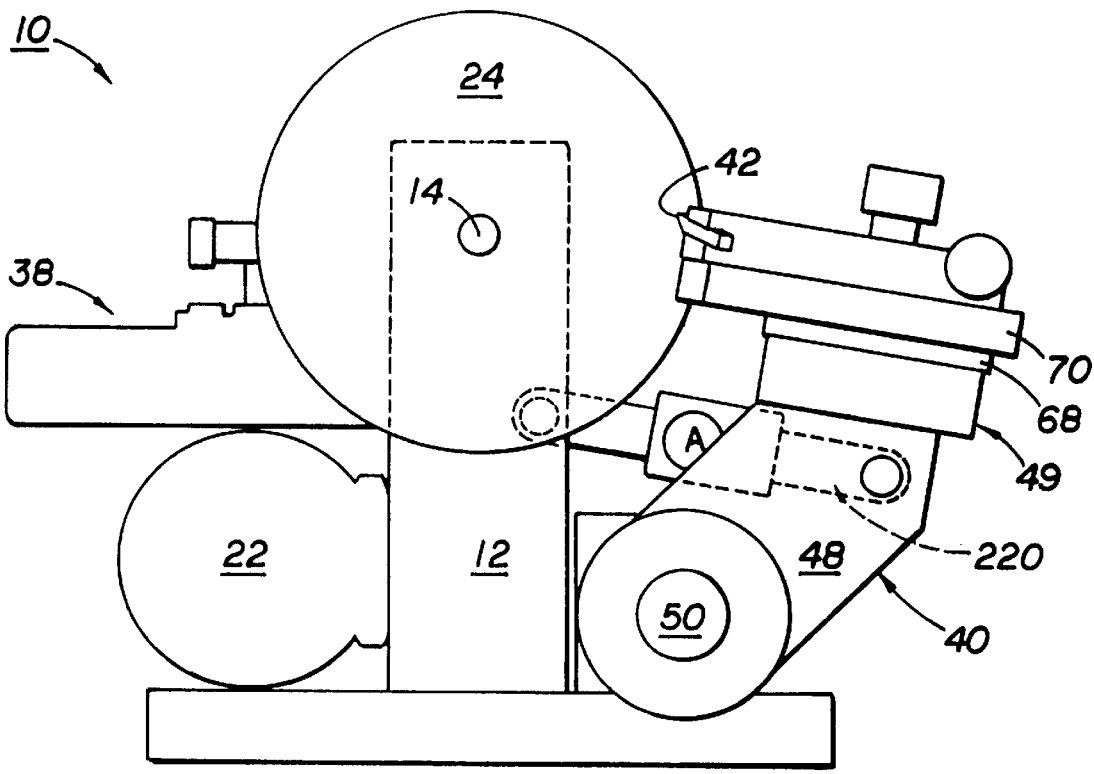
FIG. 2E is a schematic side elevational view of lathes according to the present invention using a compressed air or compressed air/mechanical linkage used to position the tool relative to the lathe.
Figure 4:
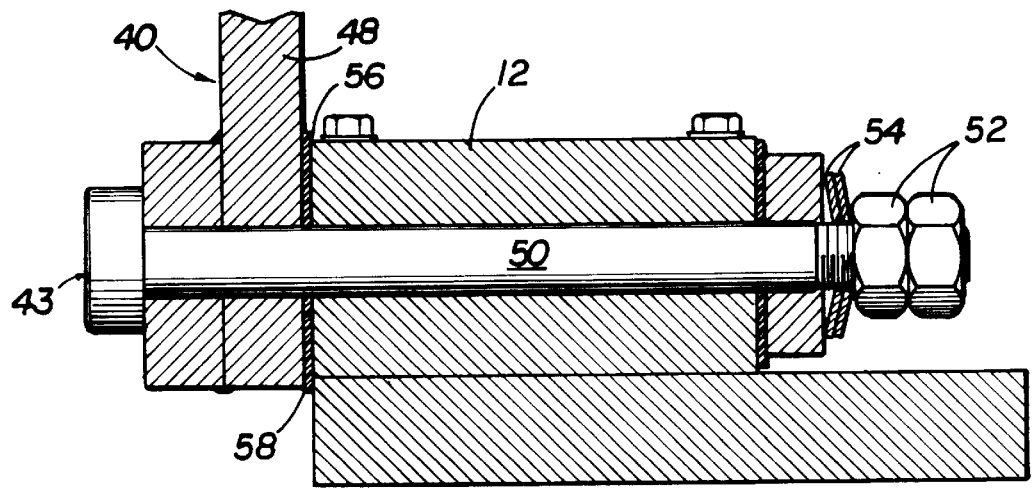
FIG. 4 is a cross sectional view of a portion of the lathe of FIG. 1 accentuating a portion of the interface between the lathe frame and the pivoting assembly.

FIG. 2E is a schematic representation of lathes according to the present invention which employ compressed air driven or compressed air/mechanical linkages 220 to govern movement of tool 42 relative to lathe 12 and workpiece 24. The compressed or compressed air/mechanical linkages 220 may be connected to lathe 12-side and pivoting-side in any desired manner including pivotally on each side, fixed on each side or fixed on one side and pivotal on the other. FIG. 2E elements apply to such systems as it does to hydraulic systems.

FIG. 2F schematically shows a linkage 230 rigidly mounted to lathe frame 12 and cooperating with a surface 235 which forms a portion of carriage 48, as one of the many alternative types of conventional connections of a linkage mechanism to lathe 12-side and pivoting lathe 12 consistent with the present invention. The linkage 230 in FIG. 2F could be, for instance, a worm gear actuated by an electric motor which drives a geared surface 235 on carriage 48. Alternatively, it could be a small drive gear precisely controlled by a drive motor which cooperates with a geared surface 235. Any desired form of conventional mechanical, electro/mechanical, hydraulic, mechanical/hydraulic, compressed air or compressed air/mechanical linkage mechanism may be employed. Such mechanisms, preferably, but need not necessarily follow the lodestar of low cost, high reliability, and acceptable precision control of movement of tool 42 relative to workpiece 24. The linkages may serve to move tool 42 radially inward as it works workpiece 24, or radially outward as it works the workpiece.

Figure 3A:
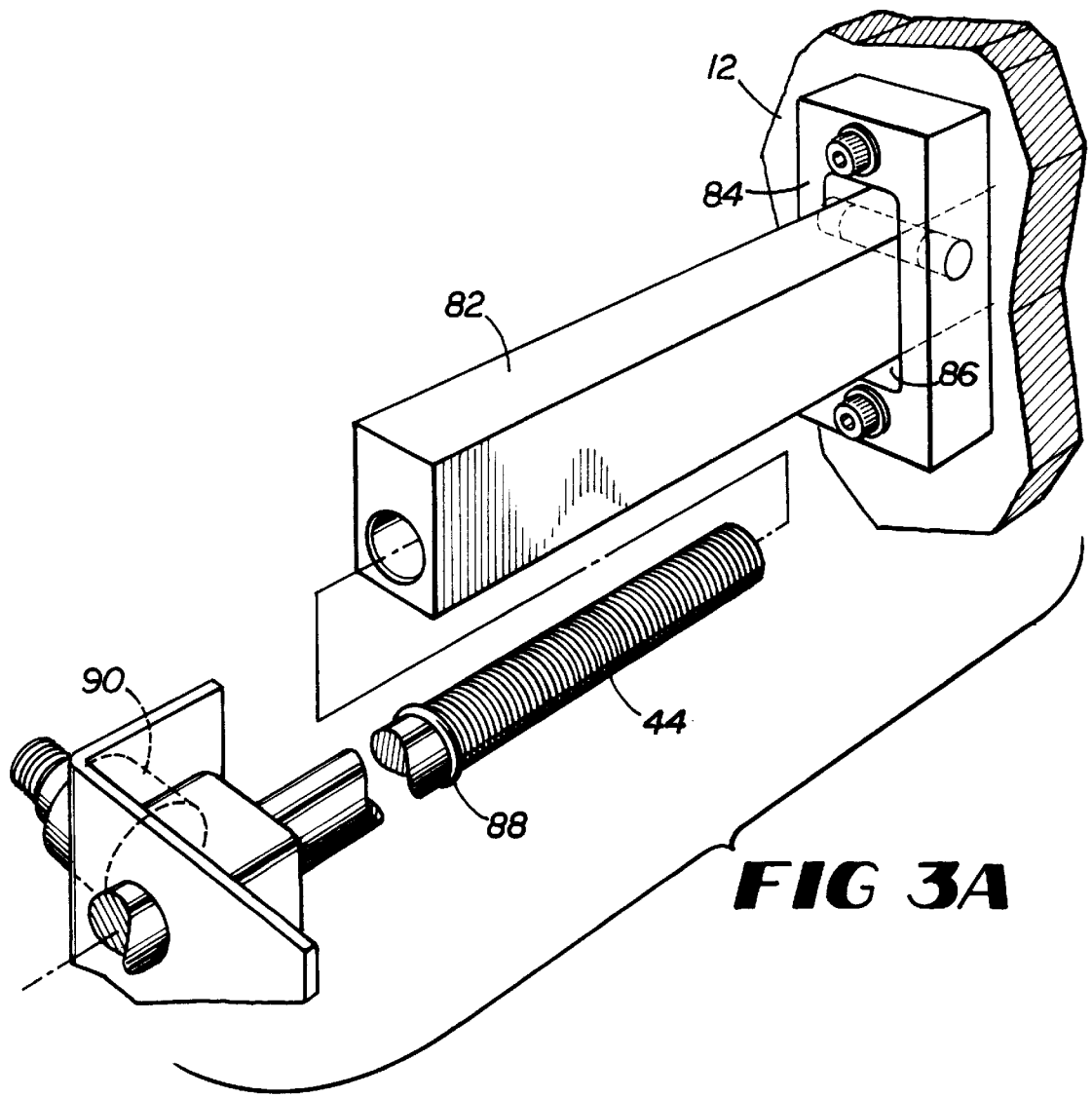
FIG. 3A is a perspective view of a portion of the lathe of FIG. 1, accentuating a feed screw/feed nut mechanism.
Figure 3B:
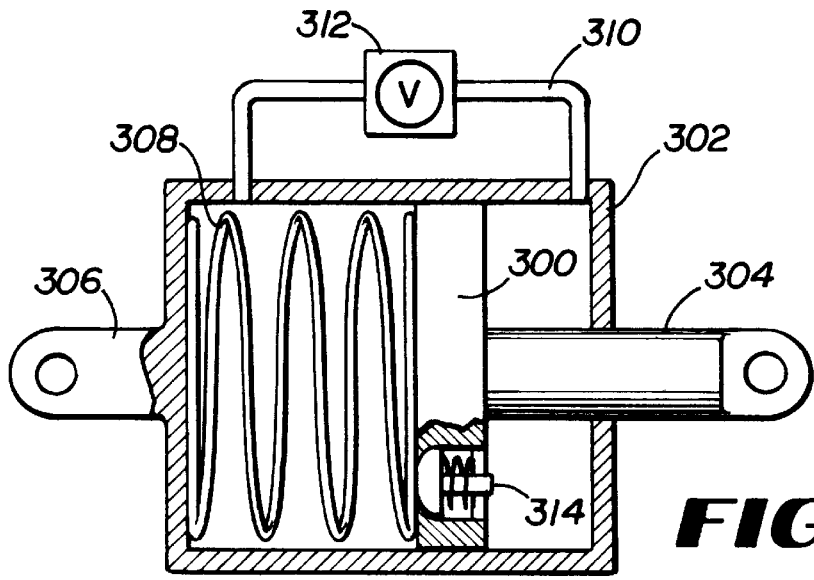
FIG. 3B is a schematic cross-sectional view of a spring actuated/hydraulically damped linkage according to the present invention.
Figure 3C:
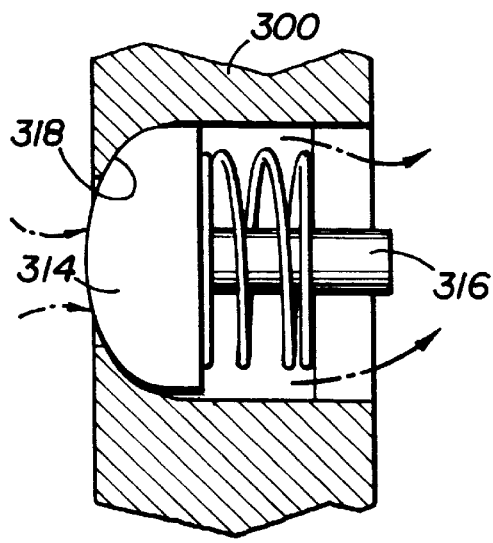
FIG. 3C is a schematic cross-sectional view of a first embodiment of a one way valve to be included in devices according to FIG. 3B.
Figure 3D:
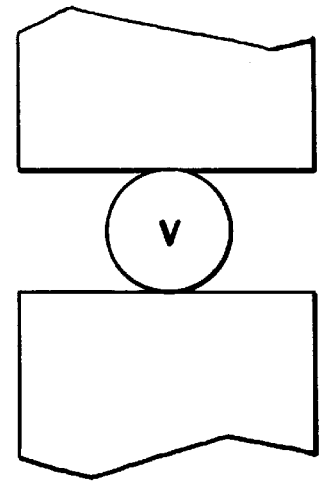
FIG. 3D is a schematic representation of any suitable one way valve to be included in devices as shown in FIG. 3B.
Figure 3E:
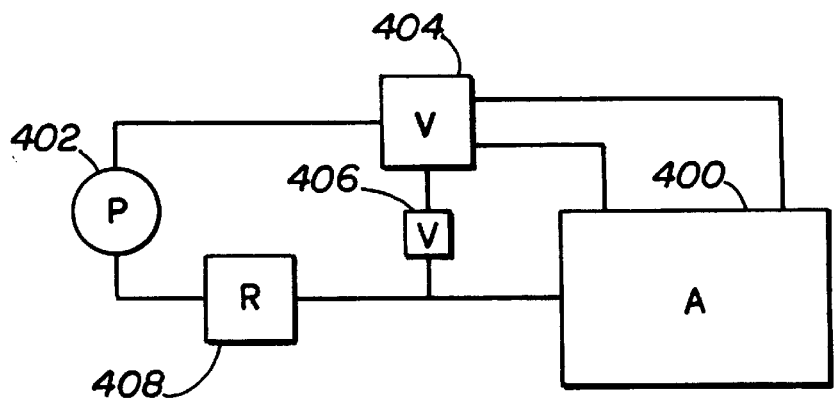
FIG. 3E is a schematic representation of a power and control system for hydraulic, hydraulic/mechanical, compressed air and compressed air/mechanical linkages for positioning tools relative to lathes according to the present invention.

FIGS. 3B, 3C and 3D show another form of a preferred linkage mechanism according to the present invention which could be classified as mechanical, mechanical/hydraulic, or mechanical/compressed air. In this version, an actuation piston 300 is carried within a fluid tight cylinder 302. The piston 300 may be connected to a push rod 304 which extends in sliding fashion from one end of cylinder 302. A push rod 304 may attach, in pivoting fashion or otherwise, to either lathe frame 12-side or pivoting-side (such as carriage 48) of devices according to the present invention. The cylinder 302 also features a mounting bracket 306 which connects to the side not coupled to push rod 304. Again, the bracket 306 is shown schematically and can represent a pivoting connection as well as a fixed/rigid connection to either lathe frame 12-side or the pivoting side.

A helical or other desired form of spring 308 bears between one end of the cylinder 302 and the piston 300, depending upon whether it is desired that the assembly shown in FIG. 3B be employed to move tool 42 radially inward or outward with respect to workpiece 24. The spring may just as easily be located elsewhere, including outside of the cylinder to achieve the desired result. The version shown in 3B is arranged to move the tool 42 radially outward with respect to the workpiece 24 as the workpiece is being worked by tool 42. Hydraulic fluid or compressed air dampens action of spring 308 as it biases piston 300, and thereby controls movement of piston 300 and therefore movement of pivoting side 49 relative to frame 12. Hydraulic flow, being incompressible, may be desired in some applications; in any event, a relief control line 310 communicating with the cylinder 302 on either side of piston 300 is controlled by a suitable valve 312 to govern flow rate of hydraulic fluid or air and thus movement of the piston 300. Valve 312 may be a needle valve, a gate valve or any other desired valve for precise control of movement of piston 300 and therefore pivoting-side 49 relative to lathe frame 12.

When the tool 42 has finished its travel relative to the workpiece 24, the linkage shown in FIG. 3B may be reset with a lever or any other desired structure (not shown) which compresses spring 308 and resets piston 300 and therefore pivoting side 49 for another workpiece. In the reset mode, rapid venting of hydraulic fluid or compressed air is permitted with one way valve 314 shown in FIG. 3B. One way valve 314 is shown schematically in FIG. 3D, and one particular embodiment is shown in FIG. 3C. In the version shown in FIG. 3C, one way valve 314 contains a spring loaded piston 316 which bears against a seal surface 318 (the valve is arranged to allow flow only when the piston 300 is being reset) and not as spring 308 is moving piston 300 relative to the cylinder 302. In a version of the linkage of 3B designed to move tool 42 radially inward with respect to workpiece 24, the spring 308 would be located so as to pull or push the push rod 304 into the cylinder 302, and the one way valve 314 would be oriented to prohibit fluid flow during that movement but allow it as push rod 304 were being retracted from the cylinder 302. Any form of one way valve may be employed, such as a flap valve, the piston type valve shown in FIG. 3C or any other valve which allows fluid to flow only in one direction and prohibits in the other.

The inventor has found that, given the significant distance between the center of interface 56 and tool 42, the arc swept by tool 42 across workpiece 24 is virtually linear, even if not absolutely precisely so. The elimination of the cross slide mechanism, and confining movement of the tool 42 only to that governed by the significantly sized interface 56, means that tool 42 forms a precise surface on workpiece 24, in the inventor's experience, more precise than in conventional lathes.

Figure 7:
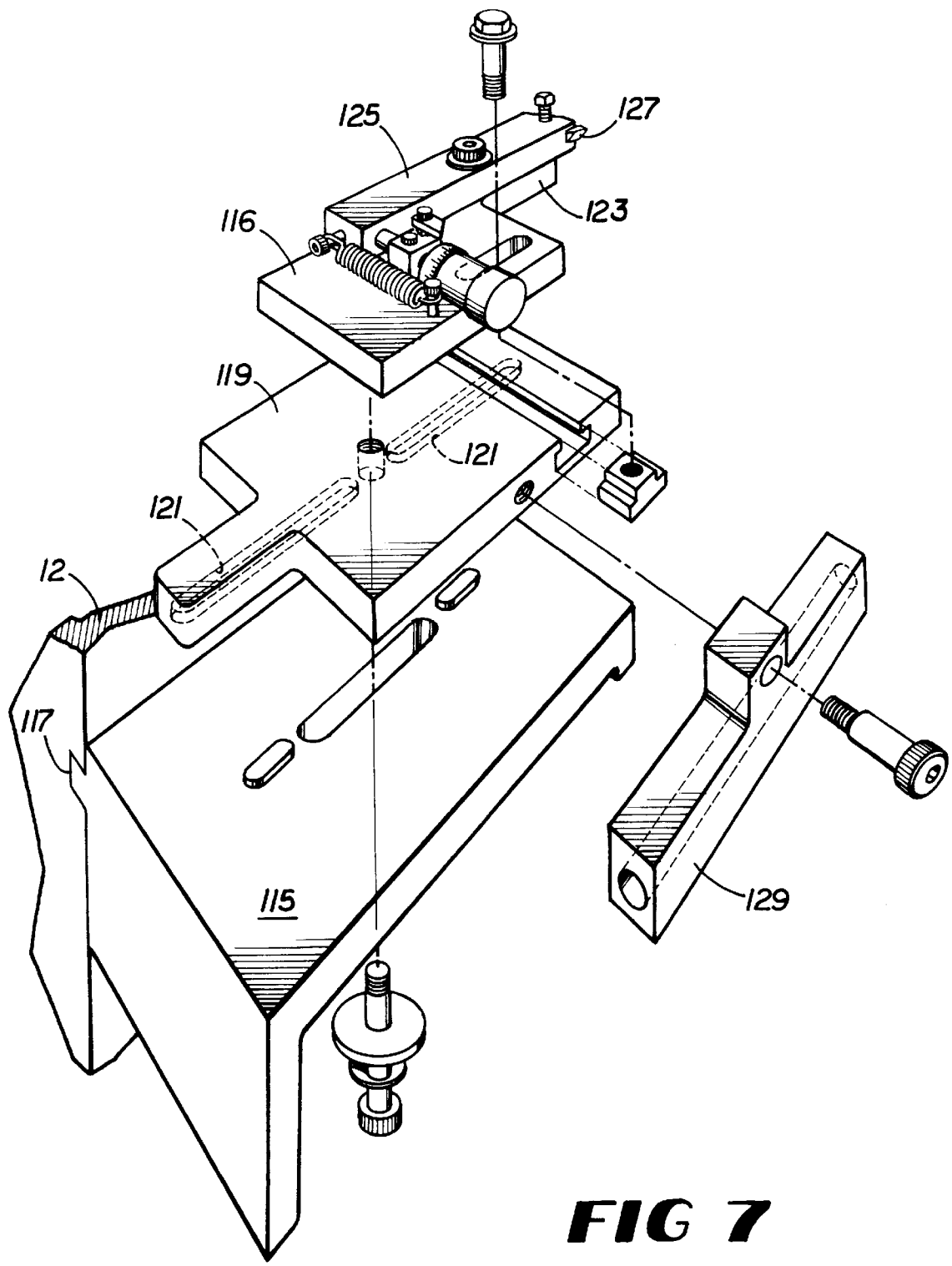
FIG. 7 is a partially exploded perspective of the lathe of FIG. 1, accentuating a portion of the drum working unit.

Drum working unit 38 may (or need not, as desired) form a part of lathe 10. In the preferred embodiment shown in the figures, drum working unit 38 may be easily attached to or removed from frame 12. In that embodiment, unit 38 (accentuated in FIGS. 5–7) comprises a slide bed 115, portions of which may fit or cooperate with a groove, step, or other means or structure for alignment 117 formed on the side of frame 12. One or more bolts or other desired fasteners may be employed to connect slide bed 115 to frame 12 precisely and easily. Slide bed 115 accommodates a slide carriage 119 which is adapted to slide on slide bed 115 in a direction precisely parallel to the axis of arbor 14. Slide carriage 119 is preferably connected to slide bed 115 via one or more keyways 121, the length of which are preferably longer than the length of travel of the tool connected to slide carriage 119 on a drum or other workpiece 24. In the preferred embodiment, a key is used in each of two keyways 121. Slide carriage 119 contains, preferably, an extension as shown in FIGS. 5–7, for instance, which is accommodates the keyway to allow an appropriate range of relative movement between slide carriage 119 and slide bed 115. The length of the keyways 121 ensure precise and accurate positioning of the cutting tool.

Slide carriage 119 also contains a channel that accommodates a nut that is used to connect saddle 116 to slide carriage 119. Saddle 116 may accordingly be bolted or otherwise fastened as desired to slide carriage 119 by the user in positioning the cutting tool during operation. Saddle 116 features a protrusion 123 which is adapted to form a seat for boring bar 125 which mounts tool 127. Boring bar 125 is thus cantilevered far less than in conventional lathes. In such lathes, the boring bar must protrude extensively from the cross slide mechanism which is too large to extend into a brake drum. Boring bar 125 and tool 127 are mounted on saddle 116 in conventional fashion as shown, for instance, in FIGS. 5–7. A feed nut 129 is bolted or otherwise connected to slide carriage 119 and receives a feedscrew 131 which may be attached to slide bed 115 using an adapter 133 which is bolted or otherwise connected to frame 12. A power source 135 which may be the type employed on rotor working unit 36, and a clutch mechanism 137 which may be like clutch mechanism 94 employed on rotor working unit 36, may be used to control automatic movement of tool 127. Electrical connection of power source 135 may be made via a NEMA Standard plug in connection on frame 12.

In use, the operator mounts workpiece 24 in conventional fashion on arbor 14 using spacers 28, if desired, and bell clamp 26. Then, if workpiece 24 is a brake rotor or a flywheel, the operator employs rotor working unit 36. He or she aligns saddle 70 and fastens it into place on saddle bed 68 so as to place tool posts 72 approximately in position so that tool 42 is positioned appropriately with respect to workpiece 24. The hand wheel 102 on feedscrew 44 is also employed to position tools 42 with respect to workpiece 24. Then, the operator uses the components of saddle 70, tool post 72 and vernier 74 to position one of the tools 42 as appropriate. Power source 92 may then be actuated to cause tool 42 to work, cut, finish or otherwise have an effect on the desired surface of workpiece 24.

If workpiece 24 is a brake drum, then the operator employs drum working unit 38. Hand wheel 102 may be used to move rotor working unit 36 out of the way before the drum is placed on arbor 14 using spacers 28 as desired and a bell clamp 26. Saddle 116 with boring bar 125 and tool 127 are positioned as desired on slide carriage 119 and tightened into place. Verniers or other desired conventional positioning mechanisms may be used in conventional fashion to fine-position tool 127 against the surface of the drum to be worked. Slide carriage 119 is positioned using hand wheel 139, and boring bar or tool post 125 is positioned with respect to carriage 119, so that tool 127 is placed appropriately with respect to the drum surface. The operator then actuates power source 135 to move slide carriage 119 and tool 127 in order to cut, work, finish or otherwise have the desired effect on the surface of the drum.

The foregoing is presented for purposes of disclosure of a preferred embodiment of the present invention. Other structural components may be employed, and other modifications may be made, without departing from the scope or spirit of the invention.

What is claimed is:

1. A lathe for finishing a radial surface of a brake rotor, comprising:
  a. a frame which rotatably receives an arbor, said arbor adapted to mount said brake rotor wherein said radial surface of said brake rotor is oriented substantially perpendicular to an axis of rotation of said arbor, said arbor connected to a power source;
  b. a pivoting assembly pivotally connected to said frame and adapted to support a tool for finishing said radial surface of said brake rotor, said pivoting assembly adapted to sweep said tool in an arc substantially perpendicular to said axis of rotation of said arbor and substantially parallel to said radial surface of said brake rotor as said pivoting assembly pivots with respect to said frame; and
  c. a linkage connected to said pivoting assembly and said frame for controlling pivoting of said pivoting assembly relative to said frame, whereby said linkage controls movement of said tool across said radial surface of said brake rotor in a direction substantially perpendicular to said axis of rotation of said arbor for finishing of said radial surface of said brake rotor, and said linkage is controlled at least partially using a fluid.

2. The lathe according to claim 1 in which the fluid is a liquid.

3. The lathe according to claim 2 in which the liquid is hydraulic fluid.

4. The lathe according to claim 1 in which the fluid is air.

5. The lathe according to claim 1 in which the linkage is controlled at least partially using a spring and a hydraulic fluid.

6. A lathe for finishing a radial surface of a brake rotor, comprising:
   a. a frame which rotatably receives an arbor, said arbor adapted to mount said brake rotor wherein said radial surface of said brake rotor is oriented substantially perpendicular to an axis of rotation of said arbor, said arbor connected to a power source;
   b. a carriage pivotally connected to said frame and adapted to support a tool for finishing said radial surface of said brake rotor, said carriage adapted to sweep said tool in an arc substantially perpendicular to said axis of rotation of said arbor and substantially parallel to said radial surface of said brake rotor as said carriage pivots with respect to said frame; and
   c. a linkage connected to said carriage and said frame for controlling pivoting of said carriage relative to said frame, whereby said linkage controls movement of said tool across said radial surface of said brake rotor in a direction substantially perpendicular to said axis of rotation of said arbor for finishing of said radial surface of said brake rotor, said linkage comprising:
      i. a piston contained in a cylinder, the piston biased by a spring, the force of the spring dampened by a fluid contained in the cylinder;
      ii. a relief line connected to the cylinder for controlling dampening of the spring by the fluid; and
      iii. a control valve communicating with the cylinder for controlling flow of fluid in the relief line.

7. The lathe according to claim 6 in which the linkage is adapted to sweep the tool away from the center of the rotor.

8. The lathe according to claim 6 in which the linkage is adapted to sweep the tool toward the center of the rotor.

9. The lathe according to claim 6 further comprising a one way valve for facilitating resetting of the piston in the cylinder.

10. The lathe according to claim 6 in which the fluid is hydraulic fluid.

11. The lathe according to claim 6 in which the fluid is air.

12. The lathe according to claim 6 in which the control valve is a needle valve.

13. The lathe according to claim 6 in which the one way valve is mounted in the piston.

14. The lathe according to claim 6 in which the one way valve is a piston valve.

15. A lathe for finishing a radial surface of a brake rotor, comprising:
   a. a frame which rotatably receives an arbor, said arbor adapted to mount said brake rotor wherein said radial surface of said brake rotor is oriented substantially perpendicular to an axis of rotation of said arbor, said arbor connected to a power source;
   b. a pivoting assembly pivotally connected to said frame and adapted to support a tool for finishing said radial surface of said brake rotor, said pivoting assembly adapted to sweep said tool in an arc substantially perpendicular to said axis of rotation of said arbor and substantially parallel to said radial surface of said brake rotor as said pivoting assembly pivots with respect to said frame; and
   c. a linkage connected to said pivoting assembly and said frame for controlling pivoting of said pivoting assembly relative to said frame, whereby said linkage controls movement of said tool across said radial surface of said brake rotor in a direction substantially perpendicular to said axis of rotation of said arbor for finishing of said radial surface of said brake rotor, said linkage comprising:
      i. a hydraulic cylinder;
      ii. a hydraulic pump connected to the hydraulic cylinder; and
      iii. a control valve connected to the hydraulic cylinder and the hydraulic pump for controlling actuation of the hydraulic cylinder.

16. A lathe for finishing a radial surface of a brake rotor, comprising:
   a. a frame which rotatably receives an arbor, said arbor adapted to mount said brake rotor wherein said radial surface of said brake rotor is oriented substantially perpendicular to an axis of rotation of said arbor, said arbor connected to a power source;
   b. a pivoting assembly pivotally connected to said frame and adapted to support a tool for finishing said radial surface of said brake rotor, said pivoting assembly adapted to sweep said tool in an arc substantially perpendicular to said axis of rotation of said arbor and substantially parallel to said radial surface of said brake rotor as said pivoting assembly pivots with respect to said frame; and
   c. a linkage connected to said pivoting assembly and said frame for controlling pivoting of said pivoting assembly relative to said frame, whereby said linkage controls movement of said tool across said radial surface of said brake rotor in a direction substantially perpendicular to said axis of rotation of said arbor for finishing of said radial surface of said brake rotor, said linkage comprising:
      i. a compressed air cylinder;
      ii. a compressed air supply connected to the compressed air cylinder; and
      iii. a control valve connected to the cylinder and the supply for controlling actuation of the cylinder.

17. A lathe for finishing a brake rotor, comprising:
   a. a frame to which an arbor is rotatably mounted, which arbor is connected to a power source and is adapted to receive the brake rotor to be finished, the brake rotor having at least one substantially planar braking surface oriented substantially perpendicular to said arbor;
   b. a pivoting assembly connected to the frame whereby said pivoting assembly is adapted to rotate with respect to said frame;
   c. at least one tool disposed on mounting structure of said pivoting assembly, said tool adapted to finish said braking surface of the brake rotor;
   d. a linkage connected to said frame and said pivoting assembly, said linkage adapted to control rotation of said pivoting assembly relative to said frame along an axis of rotation that is substantially parallel to said arbor, said rotation causing said tool to sweep, substantially in a plane that is substantially perpendicular to said arbor, in an arc across said braking surface of said rotor, in order to finish said braking surface.

18. The lathe according to claim 17 in which said linkage is connected in pivoting fashion to both said frame and said pivoting assembly.

19. The lathe according to claim 17 in which at least part of said linkage comprises a portion of said pivoting assembly.

20. The lathe according to claim 17 in which at least part of said linkage comprises a portion of said frame.

21. The lathe according to claim 17 in which said linkage comprises a hydraulic actuator.

* * * * *